Patented June 28, 1938

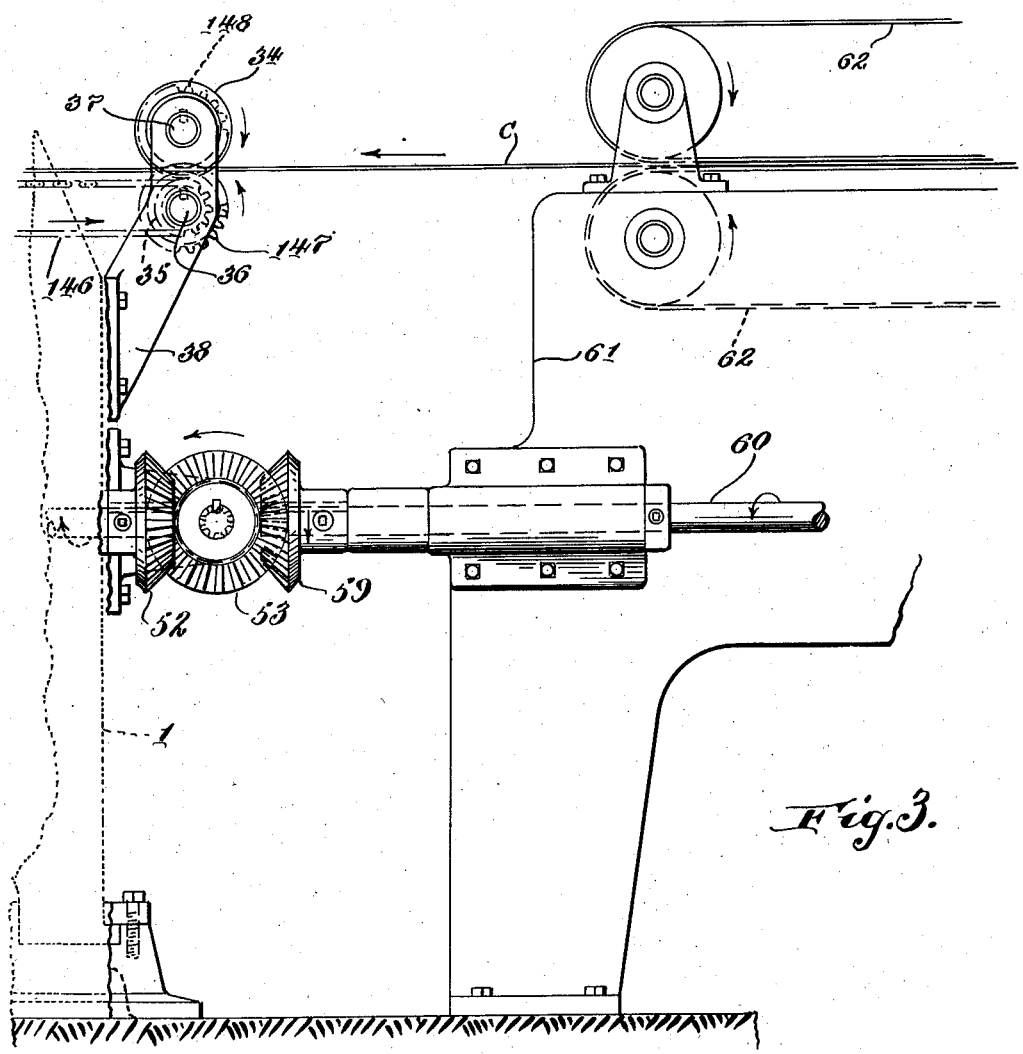

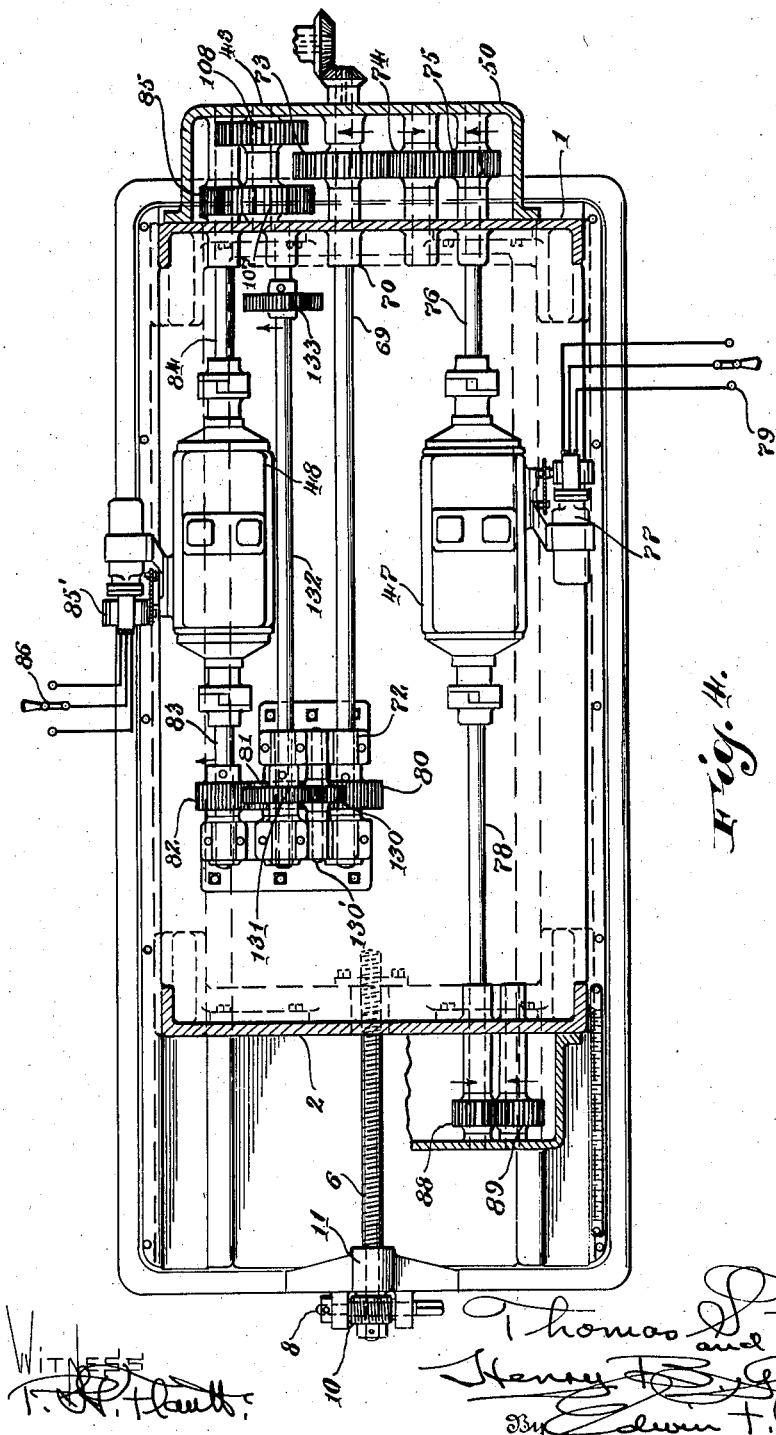

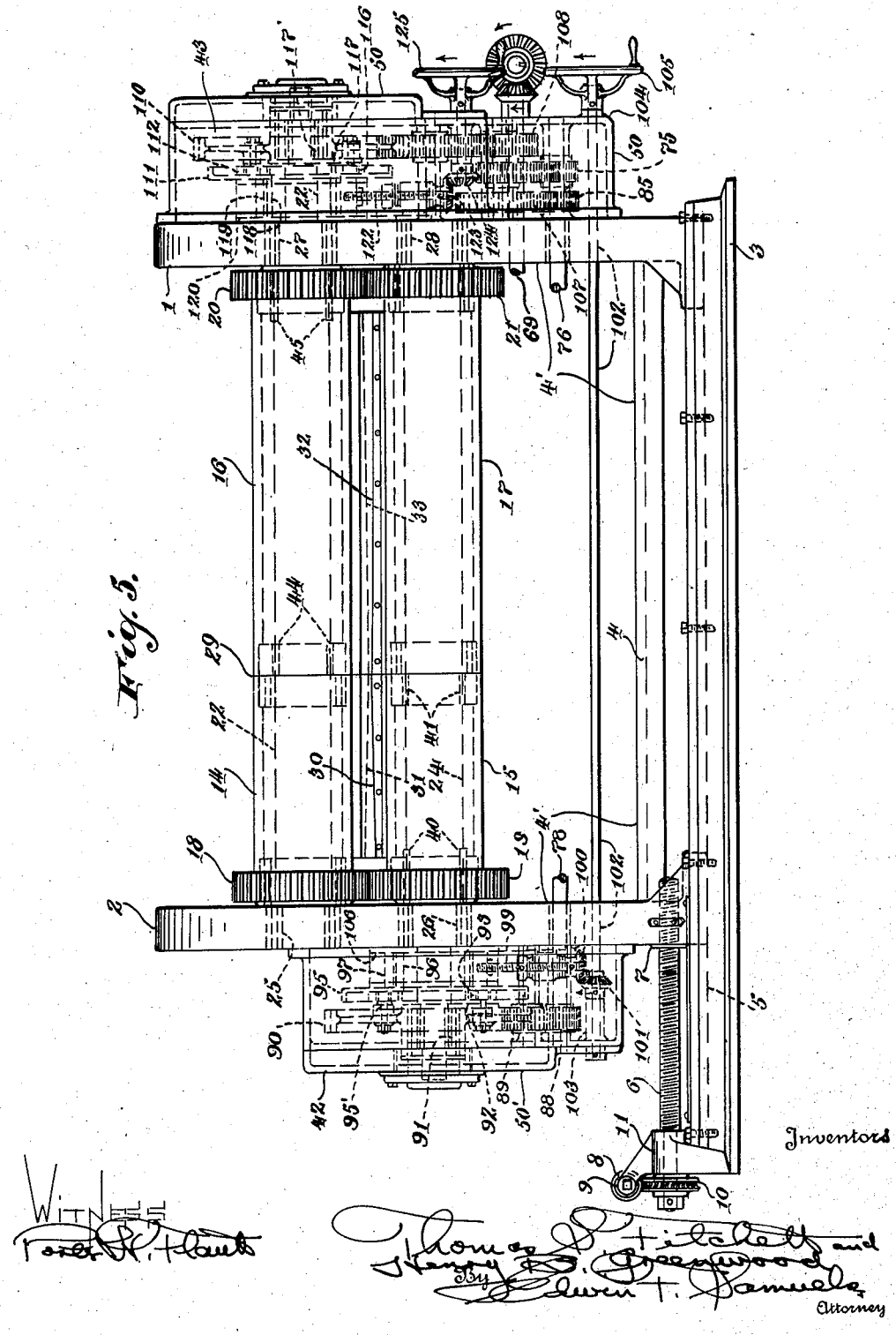

2,122,031

UNITED STATES PATENT OFFICE 2,122,031

DUPLEX CUT-OFF

Thomas S. Fitchett and Henry B. Greenwood, Glenarm, Md., assignors to F. X. Hooper Company, Inc., Glenarm, Md., a corporation of Maryland Application February 25, 1937, Serial No. 127,656

22 Claims. (Cl. 164—61)

The invention relates to a machine for cutting corrugated board or equivalent material as fiber board in the production of blanks for use in the manufacture of cartons or for any other purposes to which they may be applied. While the important features of the invention are capable of more general application, they are shown as embodied in a machine which is particularly adapted for connection to the rear or delivery end of a corrugated board machine or fiber board machine or the like which produces in the form of a continuous web the material to be cut into blanks on the present machine. As the material is fed continuously from the corrugator or other machine producing the web, it must be fed through the cutoff machine at an equal rate of speed and for this reason the two machines, i. e., the machine producing the web and the cutoff machine, are timed in close correspondence and are therefore preferably connected together to be driven at uniform or corresponding speeds.

The invention relates particularly to the duplex type of cutoff machine which operates on a web which is slitted longitudinally as it is fed, the two webs formed by slitting being cut simultaneously by the machine into blanks which may be of various dimensions determined by the position of the slit, the slitting cutters being adjustable laterally of the web, and by the relation of the number of cutting cycles per unit of time of the knives to the rate of feed, there being a cooperating pair of knives for each section into which the web is slitted, the number of cutting cycles per unit of time of the respective pairs of knives being independently adjustable to vary the dimensions of the blanks in the direction of the length of the web. By these two adjustments both dimensions of the blanks may be changed to suit the operator.

In the majority of these cutting operations, it is found desirable to so operate the cutting members or knives that they are moving at the time of cutting not only in the direction of the web but at the speed of the web and for this purpose means is provided whereby the speed of the cutting members or knives may be varied within the cutting cycle. This variation of cutting speed is timed and adjusted in its relation to the number of cutting cycles per unit of time to cause the knives at the time of cutting to move in substantial conformance with the speed of the web. The form of machine shown which is regarded as the preferred form is arranged to vary the speed of the knives by adjustment to increase or decrease it at the time of cut from a normal medium cutting speed corresponding to a medium cut and a medium number of cutting cycles per unit of time in which medium cut the knives move at a uniform rate throughout the cycle. In this way the change of speed within the cutting cycle is minimized for all cuts or sizes of blanks and is eliminated for the medium length cuts. The consequent shock or vibration due to the change of speed is likewise reduced or eliminated. The change speed mechanisms and other details of the driving mechanism shown are capable of wide variation, the arrangement of cutters shown and referred to as the single head duplex cutoff being adapted for general application to the cutting of slitted webs to produce blanks of various sizes.

In the prior art duplex machines for cutting slitted webs, the provision of two cutting heads, one beyond the other in the direction of feed, has been regarded as an essential feature. In some instances the split webs have been separated in a vertical plane, one element of each cutting head being located between the webs or between one web and the delivery apron so that a considerable deflection of the web is required. In other instances the section of the split web which is to be cut on the second head, i. e., that which is most remote in the direction of feed has been passed between the cutter operating members of the first head the knives being adjusted at right angles to the feed and along the operating members so as to contact and cut only the portion of the web intended to be cut thereby avoiding the web which is cut by the second head. In the first form of machine referred to the deflection of the split webs around the cutter carrying elements so that one cutting element of each head can be placed between the webs or between one web and the delivery conveyor has been regarded as undesirable on account of the necessity for bending the web and in all instances the elongation of the machine by the provision of two cutting heads one in front of the other as well as the lateral adjustment of the knives in the second form of machine causing them to project beyond the machine have been found most undesirable, the shortening of this type of machine having been an important consideration over a considerable period.

An important object of the present invention is to shorten the machine, using for the duplex cut a single cutting head which obtains this result in a most satisfactory manner.

A further object of the invention is to effect duplex cutting without deflecting the webs.

A still further object of the invention is the performance of the duplex cutting operation by means of a single head having continuously rotating cutting elements. It is also an object of the invention to perform the duplex cutting operation without deflection of the web and without lateral adjustment of the knives relatively to the knife operating or carrying elements.

It is also a further object of the invention to perform this operation by means of the rotary action of two pairs of knives moving about two axes or shafts each shaft carrying one rotary knife of each pair.

The invention further provides a duplex cutting mechanism having two pairs of cutter rolls or other cutter or knife carriers, the corresponding members of the two pairs of rolls or carriers being in substantial alignment transversely of the web and having a common support on each side of the web, the cutter carriers or operating members of each pair being connected together for simultaneous operation and there being separate operating mechanisms for each pair for operating the respective pairs of cutting members at independently adjustable speeds to vary independently the number of cutting cycles per unit of time. While we have referred to the simultaneous operation of the cutters of each pair it is conceivable that certain principles of the invention may be applied to two pairs of cutters or knives which cooperate in a different manner as where one member is stationary.

In accordance with the arrangement of this cutting mechanism which is regarded as most satisfactory, for the purpose in hand, the knives of one pair are of a length equalling or substantially equalling the full width of the widest web to be cut, the carriers being of corresponding length and the knives of the other pair being shorter and preferably of a length equal to substantially half the full width of the web to be cut.

To adjust and adapt the duplex cutoff mechanism to the widths of slitted webs as the slitting cutter is adjusted, the knives or cutters and cutter carriers therefore, which in the form shown are cutter rolls, are mounted on a carriage which is adjustable laterally or they are otherwise mounted for adjustment laterally of the direction of feed of the web, the adjustment being for a distance which in the preferred form is substantially equal to the length of the shorter pair of knives or cutters and carriers. It must be borne in mind, however, that main webs of various widths are cut on the same machine, and there is no limitation to a web of a width equal to the length of the long cutters. When the slit is located at the center of the web the knives of the short pair when proportioned as above span and cut the corresponding half of the slitted web. In thus cutting, they engage this web throughout substantially their entire length. The cutters of the long pair in this type of cut engage and cut the slit web on the other side of this slit throughout substantially the half of their length which is nearest to the cutters of the short pair, and the adjustment is preferably so arranged that the cutters of both pairs can be moved simultaneously from the extreme adjustment above suggested for cutting slitted webs of equal width. This adjustment moves the cutters toward the side at which the short cutters or knives are located, the slitting knife being correspondingly adjusted either with the cutters or separately thus shortening the cut made by the short pair of knives and lengthening the cut performed by the long pair of knives as the position of the slit is adjusted from middle position, the adjustment being preferably sufficient to enable the long pair of knives in the extreme adjustment opposite that shown in Figure 5 to cut the full width of the widest web employed which may be cut without slitting. The latter adjustment is used when it is desired to cut blanks of a dimension equal to the full width of the web. The machine also provides an indefinite number of intermediate adjustments between the cuts described so that all lengths of cut transversely of the web are available from the shortest desirable up to the full length of the long knives and carriers. For convenience, to shorten the adjustment the proportions of the lengths of the cutters or knives and carriers shown have been selected, the short cuts severing the relatively narrow slit web and up to the point where the webs are of equal width being performed by the short cutters on the short rolls or carriers.

While this proportioning of the length of the cutters is regarded as of considerable advantage, it is not essential to the utility of this type of duplex cutter of the invention and while the rotary knives in two pairs moving about a single pair of shafts is regarded as the best arrangement for the duplex single head such a head may be equipped with two pairs of cutter members or knives adjustable at right angles to the length of the web in the manner described or in any suitable manner and arranged with the carriers of the corresponding members of each pair in substantial alignment and otherwise operated than by rotation. The slitted web and the change of width of the sections provided for by adjusting the machine in the manner described in the above paragraphs, are referred to in certain of the claims as the sections of a slitted web of a predetermined variable width. The practice referred to is well known.

In the accompanying drawings I have illustrated a machine embodying the duplex cutoff mechanism of the invention together with change speed mechanism adapted to the operation of the cutoff in connection with a web which is fed with substantial continuity and according to the existing practice at uniform speeds as from a machine producing the web which is the use to which the cutoff machine is best adapted, the construction shown being that which is at present regarded the preferred form of the invention.

Figure 2:
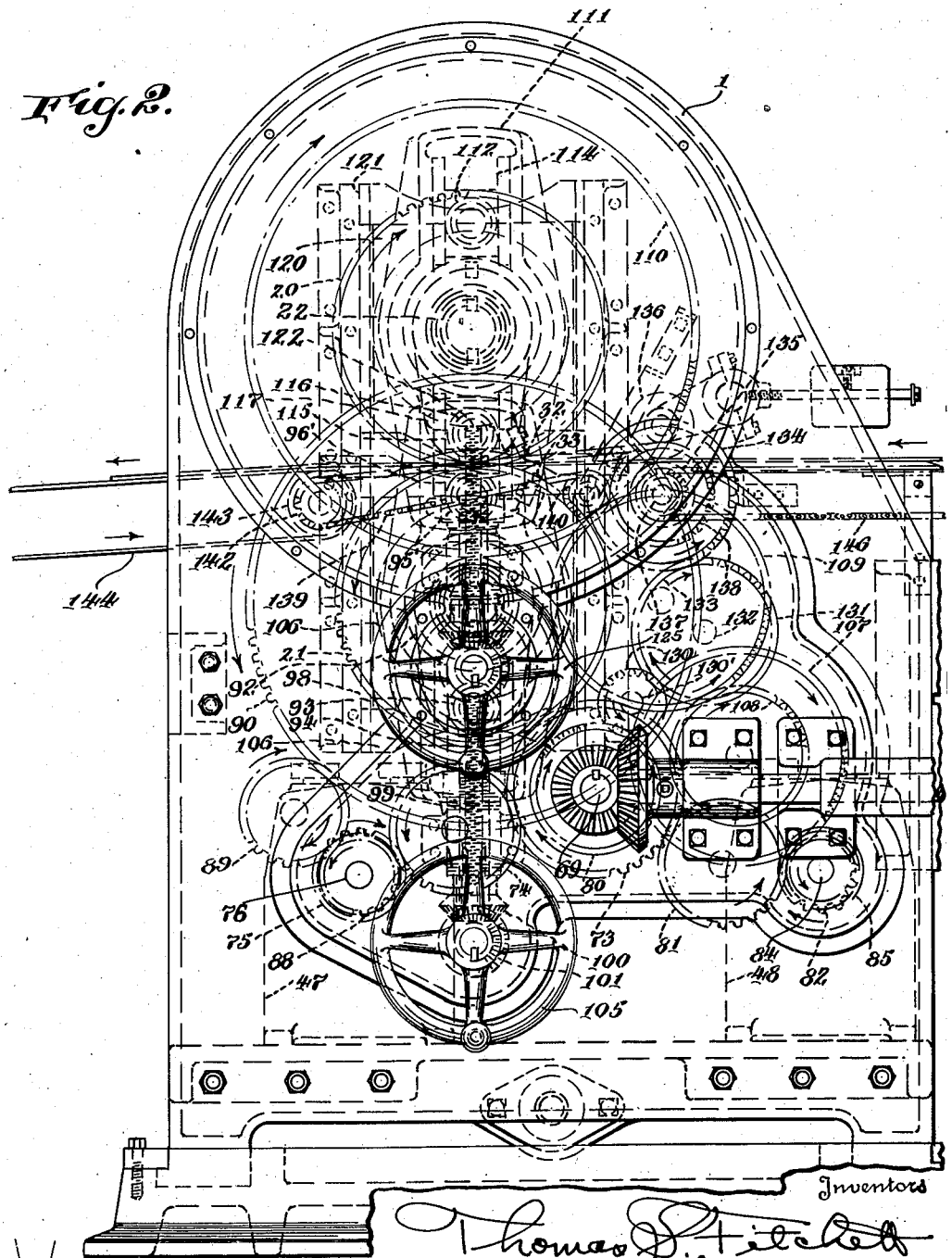
Figure 2 is a side elevation of the duplex cutoff machine of the invention showing the cutter carriers or rolls and the operating mechanism therefor, looking from the right in Figure 1.

Figure 3 being a fragmentary side elevation continuous with Figure 2 and showing the infeed end of the machine, together with the delivery end and a fragment of the delivery belts or apron of the web producing or feeding machine, at the right of Fig. 2.

Figure 4 is a plan view of the change speed drive for driving the respective pairs of cutters changing the number of cycles per minute of each pair independently of the other pair the same being shown in the form of a hydraulic drive for each set of cutters, also showing the sliding base and the bed.

Figure 5 is an elevation looking at the cutoff machine from the delivery end which is referred to as the rear of the machine the hydraulic drive which is not essential to this figure being omitted.

Referring to the drawings by numerals each of which is used to indicate the same or similar parts in the different figures, the cutoff machine shown has side frames 1 and 2, a stationary bed 3 and an adjustable sliding base 4 which is mounted for adjustment at right angles to the length of the web and the feed, in or on ways 5, formed on or secured to the bed 3, the side frames 1 and 2 being mounted on the sliding base 4, said side frames and the mechanism carried by the side frames and base 4 moving with the adjustable base 4.

In the illustration, Figure 5 which is a rear view, i. e., from the delivery end, the base plate 4 and cutting mechanism to be described are in their extreme right hand position as seen in that figure.

In the form of machine illustrated the adjustment which may be performed by any suitable type of mechanism and with any suitable support for the cutter rolls is accomplished by means of a screw shaft 6 or any suitable number of such shafts threaded into a nut or nuts 7 suitably secured in and to the side frame 2, the screw shaft 6 being in the form shown rotated for the purposes of the adjustment by means of a worm 8 mounted in suitable bearings 9 on the bed 3 and engaging a worm wheel 10 keyed or otherwise secured to the shaft of the screw 6 which has a bearing at 11 mounted on the end of the base 3.

Important features of the invention are found in the cutter carriers or rolls 14, 15, 16 and 17, their arrangement and the provision of any suitable means for adjusting them laterally of the web to cut a plurality of slit webs a of adjustable widths. The rolls 14 and 15 comprise one pair of cutter carriers which are connected together for cooperative operation in cutting the corresponding slit web a in any suitable manner as by means of intermeshing gears 18 and 19 secured to the respective rolls 14 and 15, the other pair of cutter carriers shown in the form of rolls 16 and 17, being connected in cooperative relation for cutting the other split web or web sections b by any suitable means as intermeshing gears 20 and 21 secured to the respective rolls 16 and 17. In the form of the invention shown the upper rolls or cutter carriers 14 and 16 of the respective pairs are mounted on the upper cutter shaft 22 being therefore held in substantial or in this instance exact alignment in a direction transversely of the web and the lower rolls or cutter carriers 15 and 17 of each pair are mounted on the lower cutter shaft 24 being thus likewise held in substantial or in this instance exact alignment at right angles to the direction of feed of the web. These cutter shafts 22 and 24 have bearings 25 and 26 in the side frame 2 and bearings 27 and 28 in the side frame 1. The cutter rolls or carriers 14, 16 and 15, 17 meet or substantially approach the plane of the slitting knife at 29 and the knives or cutter members 30, 31, 32, 33 at their adjacent ends are in sufficiently close relation to provide for a clean severence of the adjacent edges of the slitted webs, at each side of said plane 29.

Figure 1:
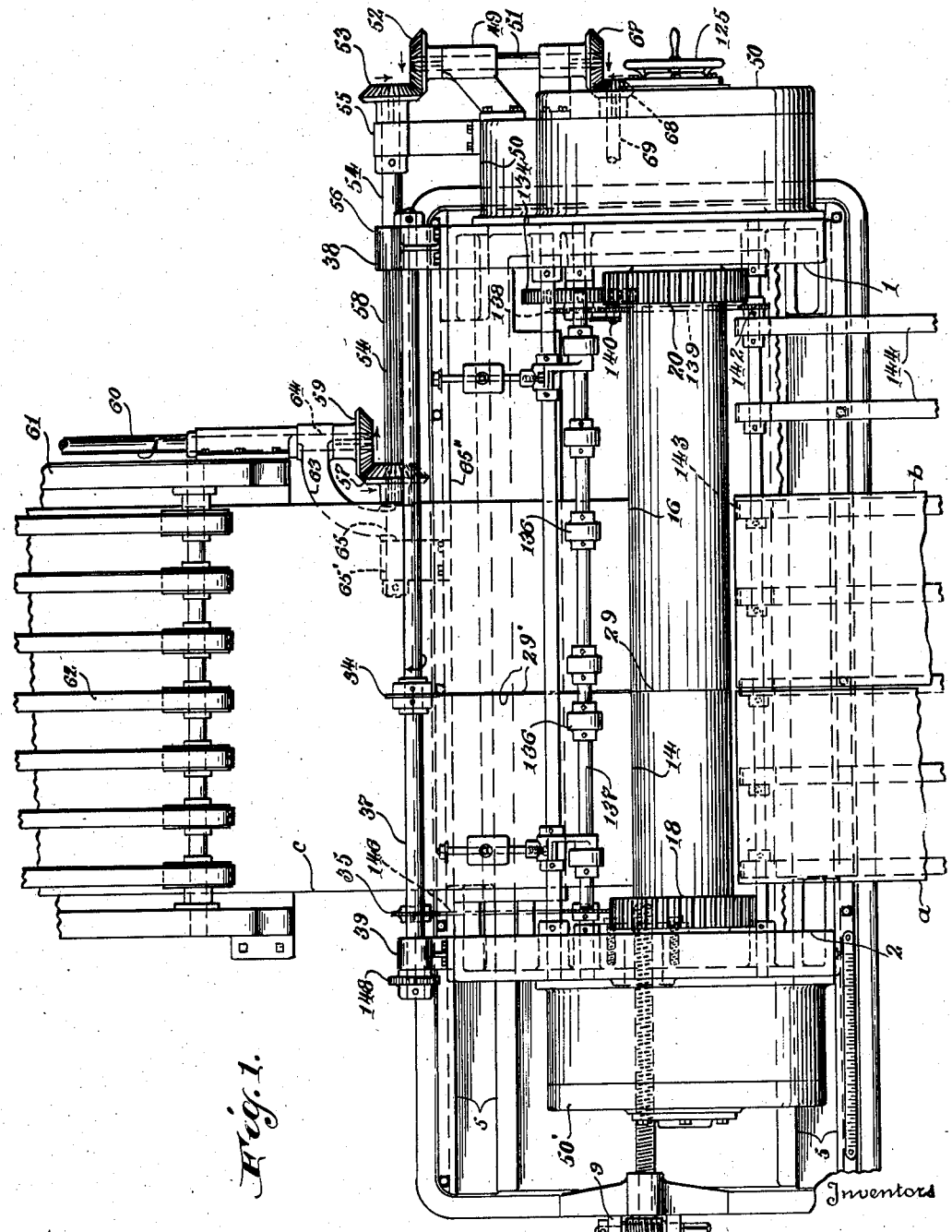
Figure 1 is a top plan view of the machine, the delivery end of the corrugator or fiber board machine or other machine from which the web is fed being shown fragmentarily.

In accordance with the preferred form of machine the slitting cutters 34 and 35 (see Figures 1 and 3) are mounted on and keyed to shafts 36 and 37 which as shown are carried in bearings in suitable brackets 38 and 39 secured to the front side of the frame members or side frames 1 and 2, thus the slitting cutters are adjusted with the rolls or pairs of rolls 14, 15, 16 and 17 being maintained in the plane 29 which extends adjacent to the inner edges of the cutting members or cutoff knives 30, 31, 32, 33. All the cutters including the slitting cutters and the cutoff knives thus mounted move and operate so that all of the cutters are adjusted by a single operation of the adjusting means provided for this purpose shown in the form of a screw 6. The other adjustments to be described have to do with the number of cutting cycles per minute and the speed of the cutters at the instant of cutting both of which are separately determined as to the two pairs of cutter carriers or rolls, 14, 15, and 16, 17. It should also be understood in this connection that the slitting cutters may if desired be separately adjusted.

In the form of the invention shown the lower roll or carrier 15 of the pair of rolls or carriers 14, 15 is keyed to the lower shaft 24 in any suitable manner as by means of keys 40 and 41 at the respective ends of the roll or carrier 15 and the pair of rolls or carriers 14, 15 are driven by any suitable change speed mechanism 42 or other suitable gearing connected to shaft 24 to drive said carriers and preferably carried by the side frame 2 and moving with the base plate 4 as are the rolls or carriers 14, 15 and 16, 17. In the preferred form shown, this gearing is adapted to determine the speed of the cutters at the instant of cutting and adjustable to conform the speed of the cutters at this time to the speed of the paper as the number of cutting cycles per unit of time is changed.

The pairs of rolls or carriers 16, 17 are driven through and by way of the gearing 43 which has a similar function and operation to that of the gearing 42, the upper roll 16 of this pair being for this purpose keyed to the shaft 22 in any suitable manner as by keys 44, 45, and the shaft 22 being driven by gearing 43. The gearing may be variously designed, arranged and connected.

As already pointed out, the short rolls 14, 15 are geared together for simultaneous operation by intermeshing gears 18, 19 which are secured to the respective rolls 14, 15 and the rolls 16, 17 which in the form shown are the relatively long pair of rolls or carriers are geared together for simultaneous operation by the intermeshing gears 20 and 21 secured to the respective rolls. The carriers or rolls 14 and 17, i. e., in the form shown, the upper roll 14 of the short pair and the lower roll 17 of the long pair being free to rotate on the respective shafts 22 and 24. In the broader conception of the invention, the cutting operation may be varied.

In the form of invention shown which is understood to be the preferred form the gearing 42 for the carriers 14 and 15 which as shown are the short carriers or rolls, the exact arrangement of the machine being capable of considerable variation, are driven from the hydraulic drive or other suitable change speed mechanism 47 (see Figure 4), and the cutter carriers or rolls 16 and 17 which in the form shown are longer than the rolls 14, 15 are driven from any suitable change speed mechanism as hydraulic drive 48 it being understood that the change of speed to which the hydraulic drives 47 and 48 are adapted is for the purpose of changing the number of cutting cycles per unit of time, of the pair of rolls 14, 15 and of the pair of rolls 16, 17, the first pair by the hydraulic drive 47 and the second pair by the hydraulic drive 48, the change being relative to the speed of the web and provided to determine the length of the cut the number of cycles per unit of time of one pair of rolls being substantially independent of the number of cutting cycles per unit of time of the other pair of rolls, or other carriers.

In the construction shown the side frame 1 (see Figures 1 and 2), carries in suitable bearings 49 mounted on the gear casing 50 which is secured to said side frame a longitudinal shaft 51 which is connected by bevel gears 52, 53 to a transverse shaft 54 and is driven therefrom. Said shaft 54 is mounted in bearings 55 on the gear casing 50 and 56 on the side frame 1. This shaft also has a bearing 65' on the front plate 65'' of the sliding base 4 and is driven by a bevel gear 57 mounted to slide thereon and having a driving connection to said shaft 54 by way of a feather 58. This gear 57 meshes with the bevel gear 59 on a longitudinal shaft 60 which is preferably connected in any suitable manner to the machine 61 shown fragmentarily in Figures 1 and 3 being driven in time with the delivery belts 62 of said machine. The gears 57 and 59 are held in mesh by an angle bracket 63 having bearings 64 and 65 on the respective shafts 60 and 54 so that as the sliding base 4, the side frames 1 and 2 and the pairs of cutter carriers 14, 15 and 16, 17 are shifted as by screw 6 to conform to the width of webs a and b as changed, the gears 59 and 57 remain in mesh, the latter gear 57 sliding along the shaft 54 by which it is driven imparting a continuous rotation to the shaft 51 in direct correspondence to and with the speed of rotation of the shaft 60 which in turn is in correspondence to and with the speed of the machine 61 and delivery belts 62 thereof which deliver the paper web to the cutoff. It may be noted that the hub of gear 57 is contacted on one side by bearing 65 and on the other side gear 59 engages said gear 57.

The shaft 51 has secured thereto a bevel gear 67 which is therefore continuously driven in time with the web feeding machine 61. This gear in turn meshes with a gear 68 secured to a shaft 69, said shaft has a bearing 70 in the side frame 1 and a bearing 72 supported by the sliding base 4. The shaft 69 has secured thereto a toothed gear 73 which meshes with a pinion 74 which in turn meshes with and drives gear 75 on the shaft 76 which drives the change speed 47 shown as in the form of a hydraulic gear, it being understood that while this type of drive is preferred, other change speed mechanisms may be employed.

The change speed mechanism 47 is shown as provided with an electric control 77 for effecting changes of ratio between the drive shaft 76 and the driven shaft 78 which is driven from the hydraulic gear 47 and this electric control mechanism 77 is operated to increase and/or decrease the speed of the shaft 78 relatively to the speed of the shaft 76 by a double throw switch 79 having one contact for increasing and the other for decreasing the speed ratio, the extent of the increase or decrease being determined by the period of time for which the switch remains in contact, the speed ratio being maintained uniform when the switch is in the middle non-contact position, the entire illustration of the electrical mechanism and the hydraulic drive being diagrammatic as the details of this mechanism are no part of the invention.

In the form shown the change speed mechanism 47 for changing the number of cutting cycles per unit of time drives the gearing 42 which drives cutter shaft 24 and controls the cutter carriers 14 and 15 shown as carrying the short cutters and in the preferred arrangement illustrated, the hydraulic or other change speed mechanism 48 drives the gearing 43 which is connected to shaft 22 and drives the cutter carriers 16 and 17 shown as the long pair of cutter carriers preferably adapted to cut the full width of the web, though they may be of any suitable length.

The hydraulic or other change speed mechanism 48 is also driven in the form shown from the shaft 69 which is provided at its inner end with a gear 80 which meshes with a gear 81 which in turn meshes with a gear 82 on the driving shaft 83 of the hydraulic or other change speed gear 48, the driven shaft 84 of which carries secured thereto a gear 85 which is connected to a train of gears to be described which drives the train of gears 43 and the shaft 22 and the cutter rolls or carriers 16, 17.

The change speed mechanism or hydraulic drive 48 is shown as provided with an electric control 85' operated by a double throw switch 86 or in any suitable manner the illustration as to these features being diagrammatic. The use of the hydraulic drive and various details referred to herein are further explained in Greenwood Patent #2,052,461.

Referring now to Figures 2 and 4, the shaft 78 driven from the hydraulic gear 47 carries a gear 88 which meshes with a toothed gear 89 which in turn meshes with a large gear 90. This gear is mounted for rotation, as on a sleeve or hub 91 secured to the lower shaft 24 of the pair of cutter shafts 22, 24 and provided with an arm 92, Figures 2 and 5, carrying a follower or roller 93 as more fully described in the previous Patent, #2,052,461. This roller or follower engages a radial slot 94 in an eccentrically adjustable plate 95. This plate 95 is driven by a roller 95' carried by gear 90 and engaging a radial slot 96'' in said plate. The plate 95 in turn drives the shaft 24 by way of roller or follower 93 which engages radial slot 94 in plate 95, follower 93 being on arm 92 secured to shaft 24. Plate 95 is provided with a projecting bearing 96 encircling and spaced outwardly from the shaft 24 and rotating in a collar 97 which is formed on a carrier 106 and which is vertically adjustable being mounted to slide in suitable ways 98 on the frame. This carrier and plate are moved by a screw 99 to which a bevel gear 100 is secured. This gear meshes with a bevel gear 101 on the shaft 102 mounted in bearings 103 in the gear casing 50', Figure 5. Said shaft 102 in the form of invention shown extends across the carriage 4' composed of side frames 1 and 2 and sliding base 4 which carries said side frames the said shaft 102 having a bearing 104 in the gear casing 50 at the right in Figure 5 and being operated by a hand crank 105 at the right. The arrangement as hereinafter described further has advantages in that both sets of cutter carriers and cutters are adjustable as to speed at the instant of cutting from the same side of the machine through the change speed mechanism for giving this change of speed within the cycle is on the opposite sides of the machine for the respective pairs of cutters.

It will be understood that the opening in the boss or sleeve 96 of the plate 95 being considerably larger than the shaft 24 and slots 94 and 96' being on opposite sides of the bearing of plate 95 the adjustment of screw 99 moving the slide 106 and the plate 95 relatively to shaft 24 provides for a change of speed of the cutters 30 and 31 mounted on the carriers 14 and 15 to increase it above or decrease it below a predetermined medium at which the plate 95 is in center position in which position of the plate, the rolls 14, 15 rotate uniformly in each cycle which uniform rotation corresponds to a medium length of cut measured in the direction of the feed of the web the hydraulic drive 47 being adjusted to give the number of cutting cycles per minute necessary to such a cut.

As the number of cutting cycles per minute is increased to decrease the length of cut thus increasing the speed of the knives the adjustment 105, 99, 95 is operated to decrease the speed of the knives at the instant of the cut to conform to the speed of the paper. According to the arrangement shown the plate 95 is lowered to perform this adjustment and is raised for the opposite adjustment, i. e., when the number of cycles of the cutters is decreased below the medium cut decreasing the number of cycles per minute so that the speed of the knife at the time of cutting must be increased to conform with the speed of the paper.

Referring again to Figure 2, the hydraulic drive 48 drives the shaft 84 at variable speeds and this shaft carries a gear 85 in line with the gear 82 which drives a gear 107 on the shaft of which is carried a gear 108 which meshes with a gear 109 which in turn drives the large gear 110 of the gearing 43 which drives the cutters 16 and 17.

This gear 110 rotates freely about shaft 22 or a sleeve thereon and the gear 110 is connected to a plate 111 which is eccentrically adjustable after the manner of the plate 95. For this purpose the gear 110 carries a roller 112 which engages a slot 114 in the plate 111, a second and opposite slot in said plate numbered 115 is engaged by a follower 116 carried on an arm 117 secured to the shaft 22 or collar 117' thereon. The plate 111 has a hub 118 with an enlarged opening which encircles the shaft 22, the opening being spaced away from the shaft 22 provides for the radial motion of the plate relatively to the shaft. This hub 118 is carried in a bearing 119 in a sliding plate or carrier 120 moving in ways 121 the carrier 120 and the eccentrically adjustable plate 111 being adjustable vertically by means of a screw 122 to which is secured a bevel gear 123 which meshes with a bevel gear 124 to the shaft of which a hand wheel 125 is secured, the same being located in the form shown and preferably immediately above the hand wheel 105 and the arrangements and timing being such that both the timing mechanisms 42 and 43 are adjusted to increase or decrease the speed of the corresponding cutters or knives at the time of cut by rotation of the corresponding hand wheel 105 or 125 in the same direction for the same change. This is the preferred arrangement as it avoids any chance of confusion in adjusting the cutting speeds of the respective sets of cutter carriers with the knives or cutters thereon.

For the purpose of driving the delivery rolls a gear 130 is mounted on a short shaft 130' above the gear 80 and meshing therewith. This gear meshes with and drives a gear 131 on a shaft 132 which carries a gear 133, Fig. 4, which meshes with a large gear 134 on the shaft of which the lower feed roll 135 is mounted, the upper feed roll driven thereby being indicated by reference character 136. The shaft 137 of the feed roll 135 and gear 134 carries a sprocket 138 over which passes a chain 139 which passes over a guide sprocket 140 thus having its two strands drawn together so it can be led through the space near the end of the rolls 16 and 17 beyond the cutters. This chain then passes over a sprocket 142 at the rear which drives a long pulley 143 which extends across the machine carrying the delivery belts 144. The shaft 137 also carries a small sprocket 145 which drives a chain 146 which operates the slitting cutter shaft 36 at the front, said slitting cutter shaft being provided with a gear 147 which meshes with a gear 148 on the upper slitting cutter shaft 37 whereby both cutters 34 and 35 are operated in unison in the operation of the machine.

In the operation of the machine the main web c is fed from the delivery belts 62 of a corrugating or other paper machine as a paper board machine, the operation of which is to best advantage continuous, the feed in practice tending to be substantially uniform and the cutoff machine of the invention is preferably connected to said web forming or feeding machine 61 to operate in time therewith.

The corresponding cutter carriers or rolls, 14, 15, 16, 17, of the two cooperating pairs and/or the knives or cutters thereon being arranged end to end on carriage 4' with their adjacent ends closely related to the plane 29 at right angles to the web and in operation closely coinciding with the edges 29' of the web at the slit, are simultaneously adjustable transversely of the web to bring the said cutter ends in or maintain them in coincidence with said edges 29' as the position of the slit and the widths of the web sections a and b are changed. This adjustment may be performed by any suitable means of which the carriage comprising side frames 1 and 2 and base plate 4, adjusted by suitable mechanism as screw 6 are regarded as a suitable example, a considerable variation of the carriage and adjusting mechanism and of the cutter carriers and gearing being contemplated. While it is not essential, the simultaneous adjustment by the same means of the slitting knives 34 and 35 which are shown as mounted on the same carriage in exact alignment with plane 29 between the ends of the pairs of cutters is regarded as of considerable advantage as it obviates the necessity for separately adjusting the cutoff mechanism and the slitting cutters into cooperative relation for each cut.

In order to adapt the machine to cut slitted webs of any width the combined widths of which are equal to the full width of the main web with the least adjustment of the rolls or cutter carriers laterally of the web the long carriers or rolls 16 and 17 have been provided of a length substantially equal to the full width of the main web c which would ordinarily be employed and the short rolls 14 and 15 of a length equal to substantially half this width. The adjustment provides for moving the abutting plane 29 of the two carriers or rolls and also the slit 29' from an extreme right hand position in Figures 1 and 5 in which position it is substantially in the center of the web. In this position the short cutters span one side of the web a which they are adapted to sever, the long cutters as to the portion thereof nearest to the plane 29 at this time spanning and being adapted to sever the other half b of the slit web. From this position the vertical plane 29' of the slit and the cutter rolls and cooperating mechanism are adjustable to the left in these figures, i. e., toward the side of the short pair of cutters, giving adjustments in which the left hand web is of decreased width and right hand web is of increased width providing for the cutting of blanks of any corresponding dimension up to the full width of the main web c in which the slitting cutters are out of contact with the web, the short cutters carried by rolls 14 and 15 being likewise out of contact with the web so that blanks having a length equal to the full width of the web are severed by the cutters 16 and 17.

While this proportioning and arrangement of the cutters and this correspondence of the length of the cutters with the width of the widest web are desirable it will be understood that main webs of less width and also main webs of greater width may be cut in the latter instance where it is not necessary to cut blanks of the full width of the web and this proportioning of the length of the cutters of the respective pairs to each other and to the length of the web is subject to any variation which provides for the desired range of the dimensions of the blanks.

The application of the driving mechanism shown, to this new type of cutter providing a continuous rotary motion of the parts, the cutters moving at uniform speed throughout each cutting cycle for a medium cut and the variation of speed within the cycle being adjustable from said medium uniform rotative speed to conform the speed of the knife to the speed of the paper by increasing or decreasing this speed at the instant of cutting relatively to said uniform speed is of considerable advantage on account of the relatively slight change of speed in the cycle even in the extreme adjustment giving a smooth operation free from vibration and a relatively slight total adjustment from said minimum, for the longest and shortest cuts.

The machine also has the very important advantage due to the new arrangement of cutters that there need be no deflection of the web and there is a very important economy of space due to the arrangement of the pairs of cutters end to end in what may be termed a single head instead of spacing them apart in the direction of feed, which requires additional space longitudinally of the machine not only for the cutters and carriers but for separate feed and delivery mechanism. The economy of space is of great importance in machines of the length which is essential to the web forming and cutoff mechanisms for this purpose and further the new construction is simplified to a considerable degree.

We have thus described a machine embodying the various features of the invention in what is at present regarded as the preferred form, the description being specific and in detail in order that the manner of constructing, applying, operating and using the invention in this form may be fully understood, however the specific terms herein are used descriptively rather than in a limiting sense the principles of the invention being capable of application in conformance with the terms of the claims.

What we claim as new and desire to secure by Letters Patent is:

1. In a machine for cutting blanks from the sections of a slit web the sections being of predetermined variable widths, of two pairs of cutters and two pairs of cutter carriers therefor the corresponding carriers of the respective pairs being arranged end to end in substantial alignment and the adjacent ends of the respective pairs of cutters being in close relation to a longitudinal plane substantially at right angles to the web, means for feeding the web sections substantially in a single plane between the cutters of the respective pairs, means for operating the cutters at independently variable speeds and means for adjusting the two pairs of carriers transversely of the feed of the web to cause the adjacent ends of the pairs of cutters to conform to the edges of the web on each side of the slit.

2. The combination in a machine for cutting blanks from two sections of a slitted main web, the said sections being of predetermined variable widths, of two pairs of cutters operatively arranged with their cutting edges transverse to the web, a carrier for each cutter, the carriers for the corresponding cutters of each pair being arranged end to end in substantial alignment and the cutters of the respective pairs having ends closely adjacent a longitudinal plane normal to the web and corresponding to said slit, means for feeding the slit web sections between the cutters of the respective pairs, the cutters of each pair spanning a corresponding web section in cutting relation, the combined lengths of the two pairs of cutters being greater than the combined widths of the web sections, means for driving the respective pairs of cutters and for adjusting the respective driving means to operate the pairs of cutters at different speeds to cut blanks of different lengths from the respective web sections and means for adjusting both pairs of cutters and carriers as a unit transversely of the web feed to maintain the respective pairs of cutters in precise cutting relation with the respective web sections.

3. The combination in a machine for cutting blanks from two sections of a slitted main web, the said sections being of predetermined variable widths, of two pairs of cutters operatively arranged with their cutting edges transverse to the web, a carrier for each cutter, the carriers for the corresponding cutters of each pair being arranged end to end in substantial alignment and the cutters of the respective pairs having ends closely adjacent a longitudinal plane normal to the web and corresponding to said slit, means for feeding the slit web sections between the cutters of the respective pairs, the cutters of each pair spanning a corresponding web section in cutting relation, the combined lengths of the two pairs of cutters being greater than the combined widths of the web sections, the cutters of one pair being substantially twice the length of those of the other pair, means for driving the respective pairs of cutters and for adjusting the respective driving means to operate the pairs of cutters at different speeds to cut blanks of different lengths from the respective web sections and means for adjusting both pairs of cutters and carriers as a unit transverse to the web feed to maintain the respective pairs of cutters in precise cutting relation with the respective web sections.

4. The combination in a machine for cutting blanks from two sections of a slitted web, the slitted sections being of predetermined variable widths, two pairs of cutters operatively arranged end to end with their cutting edges transverse to the web and having their adjacent ends closely abutting a longitudinal upright plane substantially corresponding to the slit between the web sections, means for feeding the web sections substantially in a single plane between the cutters of the respective pairs, the cutters of each pair spanning the corresponding web section, means for operating said respective pairs of cutters for severing blanks from the respective web sections as they are fed and means for adjusting the operating means for each pair, said adjustments being independent to determine the length of the blanks cut from one web section independently of the other web section, and means for adjusting both pairs of cutters equally and simultaneously in a direction transverse to the web to conform to web sections of different widths.

5. In a machine for cutting blanks from the sections of a slit web the sections being of predetermined variable widths, of two pairs of cutters and two pairs of cutter carriers therefor the corresponding carriers of the respective pairs being arranged end to end in substantial alignment and the adjacent ends of the respective pairs of cutters being in close relation to a longitudinal plane substantially at right angles to the web, means for feeding the web sections substantially in a single plane between the cutters of the respective pairs, means for operating the cutters at independently variable speeds and means for adjusting the two pairs of cutters transversely of the feed of the web to cause the adjacent ends of the pairs of cutters to conform to the edges of the web on each side of the slit, the combined length of the two pairs of cutters being in excess of the combined width of the two web sections.

6. In a machine for cutting blanks from a web comprised of a plurality of web sections of predetermined variable widths and fed at equal speeds and having substantially meeting longitudinal edges, two pairs of cutter carriers, two pairs of cutters on said carriers, means for feeding the web sections between corresponding pairs of cutters, a pair of cutter shafts, the cutters of each pair on one side of said web being mounted on one said shaft and the cutters of each pair on the other side of said web being mounted on the other shaft, means connecting the cutter carriers of each pair together for simultaneous operation, the cutters of the respective pairs having ends closely adjacent a plane parallel to the adjacent edges of said webs, means for operating the respective shafts to operate the respective pairs of cutters in the cutting operations and means for adjusting said cutter carriers and cutters simultaneously and equally transversely of said web to conform the adjacent ends of said cutters with the adjacent ends of said web sections for cutting operations and for various adjustments of the width of web, the cutters of the respective pairs being of sufficient length to span the respective web sections and completely sever them in the various cutting relations of the webs and cutters.

7. In a machine for cutting blanks from a plurality of webs of predetermined variable widths fed at equal speeds and having substantially meeting longitudinal edges, two pairs of cutter carriers and two pairs of cutters carried respectively thereby, means for feeding the webs between the cutter carriers, a pair of cutter shafts, the carriers of each pair on one side of said webs being mounted on one said shaft and the carriers of each pair on the other side of said web being mounted on the other shaft, means connecting the cutter carriers of each pair together for simultaneous operation, the cutters on said carriers having ends closely adjacent a plane parallel to the adjacent edges of said webs, means for operating the respective shafts to operate the respective pairs of cutters in the cutting operations and means for adjusting said cutter carriers and cutters simultaneously and equally transversely of said web to conform the adjacent ends of said cutters with the adjacent edges of said web sections for all cutting operations, the cutters of one pair being of a length substantially equal to half the width of the combined web sections and the cutters of the other pair being of a substantially greater length.

8. In a machine for cutting blanks from a plurality of webs of predetermined variable widths moving at equal speeds and having substantially adjacent longitudinal edges, two pairs of cutter carriers, a cutter for each carrier, means for feeding the webs between the pairs of carriers and cutters, a pair of cutter shafts, the cutters of each pair on one side of said web being mounted on one of said shafts and the cutters of each pair on the other side of said web being mounted on the other shaft, means connecting the cutter carriers of each pair together for simultaneous operation, the corresponding cutters of the respective pairs substantially meeting a longitudinal plane normal to said webs, means for operating the respective shafts to operate the respective pairs of cutters at separately adjustable speeds in the cutting operations and means for adjusting said cutter carriers and cutters simultaneously and equally transversely of said web to maintain the adjacent ends of said cutters coincident with the adjacent edges of said web sections for all cutting operations, the cutters of the respective pairs being of substantially different lengths providing in some adjustments for the severance of a relatively narrow web of adjustable width by the cutters of the short pair and for the severance of the relatively wide web of adjustable width by the cutters of the relatively long pair.

9. In a machine for severing blanks from two web sections of predetermined variable widths moving at equal speeds and having substantially meeting longitudinal parallel edges, two pairs of cooperating cutters arranged end to end transversely of the web, the corresponding cutters of the respective pairs having their adjacent ends in close proximity to a longitudinal plane normal to the web and corresponding to the adjacent edges of the web sections, means for operating the pairs of cutters and means for timing them to change the length of the blanks cut and means for adjusting both said pairs of cutters to a series of operative positions moving said plane of the adjacent ends of the cutters to conform to the adjacent edges of the web sections as the width of the respective web sections is changed.

10. In a duplex cutoff mechanism for cutting blanks from the slit sections of a single web, the sections being of predetermined variable widths, means for feeding the web, two pairs of cutters arranged end to end transversely of the feed of the web and adapted to span the respective web sections the machine comprising means for feeding the slitted web in a single plane between the cutters of the respective pairs, the cutters of the respective pairs being spaced slightly on each side of a longitudinal plane corresponding to the plane of the slit and at right angles to the web, means for operating said cutters and means for adjusting the operation of each pair independently of the other to vary the number of cutting operations per unit of time, a carriage mounted for adjustment transversely of the web, said cutters and part of the operating means being mounted on said carriage and means for adjusting said carriage and cutters and operating means to maintain the said plane of the adjacent ends of said cutters coincident with the slit as the width of the respective slit webs is changed.

11. In a duplex cutoff mechanism for cutting blanks from the slit sections of a single web, said sections being of variable widths, two pairs of cutters arranged end to end transversely of the feed of the web and adapted to span the respective web sections, the machine comprising means for feeding the slitted web sections between the respective pairs of cutters, the cutters of the respective pairs having their adjacent ends spaced slightly on each side of a longitudinal plane at right angles to the web, means for operating said cutters and means for adjusting the operation of each pair independently of the other to vary the number of cutting operations per unit of time, a carriage mounted for adjustment transversely of the web, said cutters being mounted on said carriage and means for adjusting said carriage to conform the said plane of the adjacent ends of said cutters to said slit as the width of the respective slit webs is changed, the cutters of one pair being substantially shorter than the cutters of the other pair and the adjustment being arranged to move the cutters so that the cutters of the short pair may be moved from a position in which they engage the web for substantially their full length to a position in which their ends adjacent the long cutters are substantially withdrawn from the web, the long cutters being extended substantially across the entire width of the unslit web.

12. In a machine for cutting blanks from the sections of a slitted web, the sections being of predetermined variable widths, two pairs of cutters and two pairs of cutter carriers on which the corresponding cutters of the respective pairs are mounted, a pair of substantially parallel cutter shafts extending across the path of the web above and below the same, one carrier of each pair being mounted on each said shaft, the respective carriers of each pair being geared together, means for feeding the web at substantially uniform speeds between the pairs of carriers and cutters, means for operating the respective pairs of cutters in successive cutting cycles at independently variable speeds and means for adjusting the cutter carriers transversely of the path of the web to conform the adjacent ends of the cutters to the adjacent edges of the respective web sections at the slit, the cutters of the respective pairs being of sufficient length to span the corresponding web sections and completely sever the same in all cutting positions.

13. In a machine for cutting blanks from the sections of a slitted web of predetermined variable width, two pairs of cutters and two pairs of cutter carriers on which the corresponding cutters of the respective pairs are mounted, a pair of substantially parallel cutter shafts, one carrier of each pair being mounted on each said shaft, the respective carriers of each pair being geared together to move in cooperative relation, means for feeding the web at substantially uniform speeds between the pairs of carriers and cutters, means for operating the respective pairs of cutter carriers in successive cutting cycles, means for adjusting the speeds of one pair independently of the other pair, and means for adjusting the cutter carriers in a direction at right angles to the feed to conform the adjacent ends of the cutters to the adjacent edges of the respective web sections at the slit, the cutters of the respective pairs being of sufficient length to span the corresponding web sections and completely sever the same in all cutting positions, the respective pairs of cutter carriers being connected together to be moved as a unit by said adjustment.

14. In a machine for cutting blanks from the sections of a slitted web of predetermined variable width, two pairs of cutters and two pairs of cutter carriers on which the corresponding cutters of the respective pairs are mounted, a pair of substantially parallel cutter shafts, one carrier of each pair being mounted on each said shaft, the respective carriers of each pair being geared together, one carrier of one pair having a driving connection to one shaft and one carrier of the other pair having a driving connection to the other shaft, means for feeding the web at substantially uniform speeds between the pairs of carriers and cutters, means for operating the respective pairs of cutters in successive cutting cycles, means for independently adjusting said driving means for the respective pairs to change the number of cutting cycles per unit of time to vary the length of cut, means for independently adjusting the speed of the cutters within the cycle at the time of cutting and means for adjusting the cutter carriers in the direction of the length of the cutter shafts to conform the adjacent ends of the cutters to the adjacent edges of the respective web sections at the slit, the cutters of the respective pairs being of sufficient length to span the corresponding web sections and completely sever the same in all cutting positions, the respective pairs of cutter carriers being connected together to be moved as a unit by said adjustment, and a cutter for slitting the web aligned with the adjacent ends of the cutters of the respective pairs and connected to said latter adjustment to move therewith being thus maintained in alignment with the adjacent ends of the pairs of cutters in all cutting positions.

15. In a machine for cutting blanks from the sections of a slitted main web, the sections being of predetermined variable widths, two pairs of cutters and two pairs of cutter carriers therefor, the corresponding carriers of the respective pairs being arranged end to end in substantial alignment and the adjacent ends of the respective pairs of cutters being in close relation to a longitudinal plane substantially at right angles to the web, means for feeding the web sections substantially in a single plane between the cutters of the respective pairs, means for operating the cutters at independently variable speeds and means for adjusting the two pairs of carriers and cutters transversely of the feed of the web to cause the adjacent ends of the pairs of cutters to conform to the edges of the web on each side of the slit, and a slitting cutter for slitting the web mounted to operate in said longitudinal plane and connected to said transverse adjustment to move with the adjustment of the cutter carriers maintaining its position in said plane in all cutting positions.

16. In a machine for cutting blanks from a web consisting of a plurality of web sections of predetermined variable widths and fed at equal speeds and having substantially meeting longitudinal edges, two pairs of cutter carriers, two pairs of cutters on said carriers, means for feeding the web sections between corresponding pairs of cutters, a pair of cutter shafts, the cutters of each pair on one side of said web being mounted on one said shaft and the cutters of each pair on the other side of said web being mounted on the other shaft, means connecting the cutter carriers of each pair together for simultaneous operation, the cutters of the respective pairs having ends closely adjacent a plane parallel to the adjacent edges of said webs, means for operating the pairs of cutters in successive cutting operations and for independently varying the number of cutting cycles per unit of time and means for adjusting said cutter carriers and cutters simultaneously and equally transversely of said web to conform the adjacent ends of said cutters with the adjacent edges of said web sections for all cutting operations and for various adjustments of the width of web, the cutters of the respective pairs being of sufficient length to span the respective web sections and completely sever them in the various cutting relations of the webs and cutters, said operating means for each pair of cutters including means for changing the speed of the cutters at the instant of cutting to conform the speed of the cutters to the speed of the web, the speed of the cutters in their respective cycles being uniform for a predetermined medium cut and being adjustable to increase or decrease the speed of the cutters from said uniform speed at the instant of cutting to conform the cutters to the speed of the paper as the number of cycles is increased or decreased to change the length of the cut.

17. In a duplex web cutoff machine for cutting blanks from the sections of a slitted main web, the sections being of predetermined variable widths, two pairs of cutters and two pairs of cutter carriers therefor arranged end to end transversely of the feed, means for feeding the web sections to the respective pairs of cutters, means for operating the respective pairs of cutters in successive cutting cycles at adjustable speeds and means for adjusting the cutter carriers transversely of the feed to conform the adjacent ends of the cutters to the adjacent edges of the web sections, the cutters of one pair being of a length greater than half the width of the main web, the combined length of the pairs of cutters being greater than the total widths of said web and the respective pairs of cutters spanning the corresponding web sections in the cutting operation.

18. In a duplex web cutoff machine for cutting blanks from the sections of a slitted main web, the sections being of predetermined variable widths, two pairs of cutters and two pairs of cutter carriers therefor arranged end to end transversely of the feed, means for feeding the web sections to the respective pairs of cutters, means for operating the respective pairs of cutters in successive cutting cycles at adjustable speeds, the operating means and the supports for the respective pairs being at opposite sides of the web and means for adjusting the cutter carriers transversely of the feed to conform the adjacent ends of the cutters to the adjacent edges of the web sections, the cutters of one pair being of a length greater than half the width of the main web, the combined length of the pairs of cutters being greater than the total widths of said web and the respective pairs of cutters spanning the corresponding web sections in the cutting operation.

19. In a machine for cutting blanks from a plurality of webs arranged in the relation of the sections of a slitted web, means for feeding the web, a plurality of cutters, mounted to operate substantially about a single axis at right angles to the web and on closely adjacent separate paths, the adjacent ends of the cutters conforming to the edges of the web sections on each side of the slit, means for operating the respective cutters at different speeds, and means for adjusting said speeds and cooperating cutting means for each said cutter adapted to engage the web oppositely to the corresponding cutter.

20. In a machine for cutting blanks from a plurality of webs arranged in the relation of the sections of a slitted web, means for feeding the web, a plurality of cutters mounted to operate substantially about a single axis at right angles to the web and on closely adjacent separate paths, the adjacent ends of the cutters conforming to the edges of the web sections on each side of the slit, means for operating the respective cutters at different speeds, and means for adjusting said speeds, cooperating cutting means for each said cutter adapted to engage the web oppositely to the corresponding cutter, and means for adjusting the cutters in the direction of said axis to conform to changes of the widths of the respective webs.

21. In a machine for cutting blanks from a plurality of web sections arranged in the relation of the sections of a slitted web, means for feeding the web sections, a plurality of cutters and a shaft arranged transversely of the web, on which shaft the cutters are mounted, means for operating the respective cutters at different speeds, means for adjusting said speeds and means for adjusting the cutters in the direction of the length of the shaft, the cutters having their adjacent ends adapted for conformance with the adjacent edges of the web sections, and cutting means cooperating with each said cutter and engaging the corresponding web sections on the opposite side of the web.

22. In a machine for cutting blanks from a plurality of web sections arranged in the relation of the sections of a slitted web, means for feeding the web sections, a plurality of cutters and a shaft arranged transversely of the web, on which shaft the cutters are mounted, means for operating the respective cutters at different speeds, means for adjusting said speeds, the cutters having their adjacent ends adapted for conformance with the adjacent edges of the web sections, and cutting means cooperating with each said cutter and engaging the corresponding web sections on the opposite side of the web, and a carriage supporting said shaft and cutters and means for adjusting said carriage and the cutters thereon in the direction of the length of said shaft.

THOMAS S. FITCHETT.
HENRY B. GREENWOOD.